March 22, 1966 E. R. DAVIES ET AL 3,241,321
SEMI-AUTOMATIC POWER TRANSMISSION WITH DUMP-AND-FILL COUPLING
Filed May 19, 1964 6 Sheets-Sheet 1

Fig.1

INVENTORS:
EDWARD R. DAVIES
BY RICHARD V. OXFORD
LOUIS GRABILL
Donnelly, Mentag & Harrington
ATTORNEYS.

March 22, 1966  E. R. DAVIES ET AL  3,241,321
SEMI-AUTOMATIC POWER TRANSMISSION WITH DUMP-AND-FILL COUPLING
Filed May 19, 1964  6 Sheets-Sheet 3

Fig. 3

INVENTORS:
EDWARD R. DAVIES
BY RICHARD V. OXFORD
LOUIS GRABILL
Donnelly, Mentag & Harrington
ATTORNEYS.

March 22, 1966    E. R. DAVIES ET AL    3,241,321
SEMI-AUTOMATIC POWER TRANSMISSION WITH DUMP-AND-FILL COUPLING
Filed May 19, 1964    6 Sheets-Sheet 5

INVENTORS:
EDWARD R. DAVIES
BY RICHARD V. OXFORD
LOUIS GRABILL
Donnelly, Mentag & Harrington
ATTORNEYS March 22, 1966 E. R. DAVIES ET AL 3,241,321
SEMI-AUTOMATIC POWER TRANSMISSION WITH DUMP-AND-FILL COUPLING
Filed May 19, 1964 6 Sheets-Sheet 6

INVENTORS:
EDWARD R. DAVIES
BY RICHARD V. OXFORD
LOUIS GRABILL
Donnelly, Monteg & Harrington
ATTORNEYS United States Patent Office 3,241,321
Patented Mar. 22, 1966

3,241,321
SEMI-AUTOMATIC POWER TRANSMISSION WITH DUMP-AND-FILL COUPLING
Edward R. Davies, Bloomfield Hills, Richard V. Oxford, Birmingham, and Louis Grabill, Madison Heights, Mich., assignors to Jered Industries, Inc., Birmingham, Mich., a corporation of Michigan
Filed May 19, 1964, Ser. No. 368,652
6 Claims. (Cl. 60—54)

Our invention relates generally to hydrokinetic power transmission mechanisms, and more particularly to a semi-automatic power transmission mechanism adapted especially for use in a torque delivery driveline.

In a preferred form of our invention, a hydrokinetic torque converter unit is disposed between the crankshaft of an internal combustion engine and a power input shaft of a gear system for a vehicle driveline. It should be understood, however, that our invention is not restricted in use to environments of this type. Provision is made for operating in any one of several forward drive speed-ratios or a reverse drive speed-ratio. The hydrokinetic torque converter unit multiplies engine torque before it is distributed to the power input element of the gear system. For any given speed-ratio of the gear system, an infinite variation in the overall speed-ratio can be achieved. Each speed-ratio of the gear system thus produces a separate operating range for the driveline.

The hydrokinetic torque converter unit can be rendered operative or inoperative selectively by means of a valve system that is triggered by the vehicle operator at a time prior to a speed-ratio change in the gear system. Thus the torque delivery path is interrupted thereby making it possible to obtain a speed-ratio change in the gears of the gear system by applying or releasing an appropriate synchronizer clutch mechanism. After the gear system is conditioned for a different speed-ratio, the control system then renders the torque converter unit active to condition again the driveline for operation in a different performance range.

The provision of a system of the type above set forth being a principal object of our invention, it is a further object of our invention to provide a hydrokinetic power transmission mechanism having a hydrokinetic unit with pump and turbine members situated in a closed toroidal fluid flow circuit and wherein provision is made for selectively emptying the torus circuit to render the hydrokinetic unit inactive and to interrupt the torque delivery path during a speed-ratio change.

It is a further object of our invention to provide a hydrokinetic power transmission having synchronizer clutch controlled torque delivery gears wherein the mechanical torque multiplication ratios of the gears are augmented throughout a relatively wide speed-ratio range by a hydrokinetic torque multiplication factor.

It is a further object of our invention to provide a multiple speed, semi-automatic power transmission mechanism that is characterized by a smooth load pick-up during acceleration from a standing start and by cushioned inertia forces.

It is a further object of our invention to provide a semi-automatic power transmission for a vehicle driveline that does not require a driver controlled, friction-type, neutral clutch. We contemplate that service problems normally associated with such friction clutches will be eliminated.

It is a further object of our invention to provide a power transmission mechanism of the type above set forth wherein provision is made for transferring fluid from the hydrokinetic torus circuit to a reservoir that surrounds the hydrokinetic unit when interruption in the torque delivery path is desired.

It is a further object of our invention to provide a mechanism of the type above set forth wherein transfer of fluid from the reservoir to the circuit and from the circuit to the reservoir is accomplished within a minimum time interval.

It is a further object of our invention to provide a hydrokinetic power transmission mechanism having a dump-and-fill hydrokinetic unit wherein provision is made for maintaining continuous circulation of cooling oil through the torus circuit of the hydrokinetic unit during operation.

It is a further object of our invention to provide a hydrokinetic power transmission mechanism having a dump-and-fill torque converter unit with a self contained reservoir and wherein scoop members are situated within the reservoir to effect a transfer of fluid from the reservoir to the hydrokinetic unit in a minimum amount of time to condition the torque converter unit for torque multiplication. We contemplate also that the hydrokinetic unit will include a valve system that functions in response to centrifugal force due to rotation of the impeller member of the unit and in response to a control signal pressure force that is developed by reason of the velocity pressure of the rotating fluid in the reservoir.

It is a further object of our invention to provide a control system for a torque converter mechanism mentioned in the preceding object, said control system including portions that respond to a fluid pressure signal to control distribution of fluid through the scoop members and to control also the distribution of fluid through the dump valve structure which is located at the radially outward region of torus circuit.

Further objects and features of our invention will become apparent from the following description and from the accompanying drawings, wherein.

Figure 1:
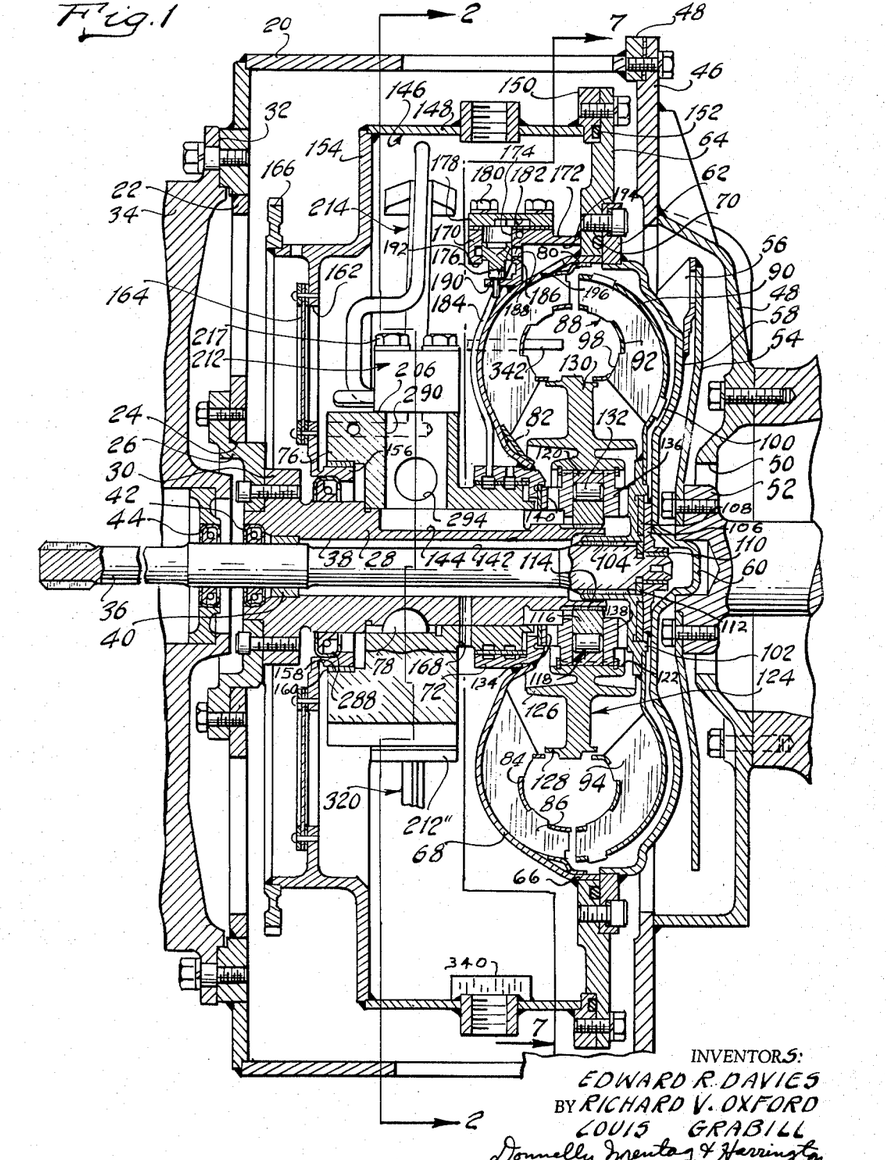
FIG. 1 shows a longitudinal cross sectional view of the hydrokinetic portions of the driveline.
Figure 5:
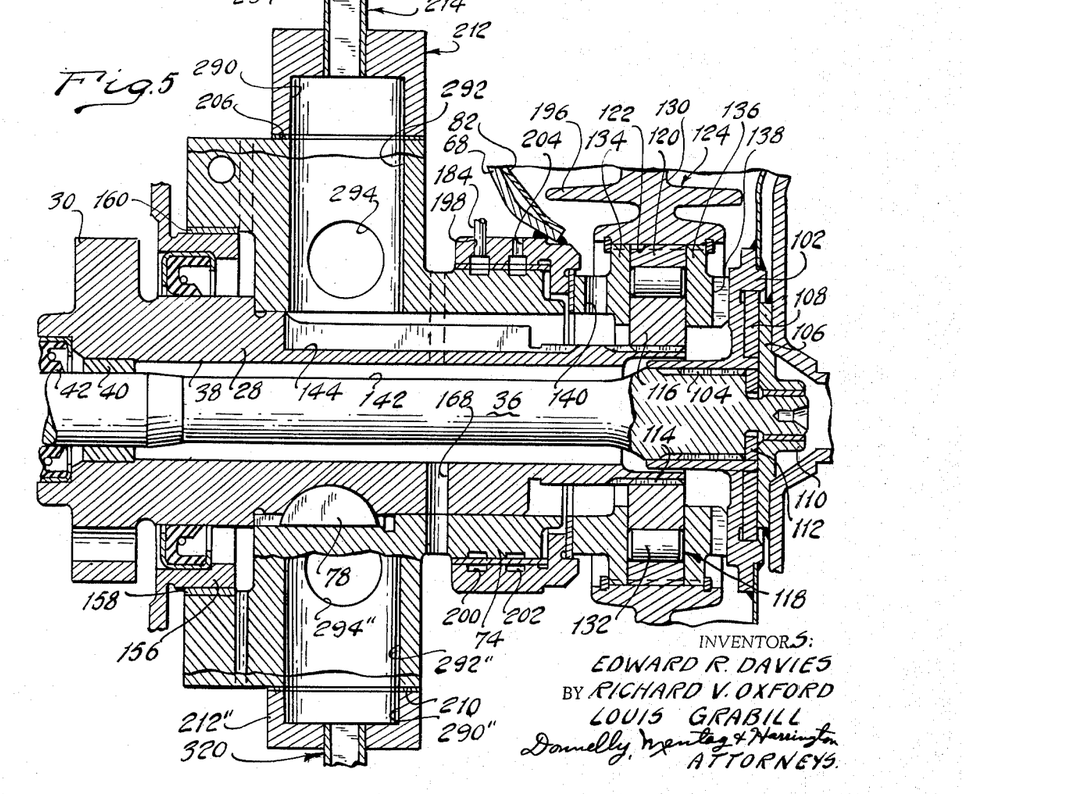
FIG. 5 is a longitudinal cross sectional view taken along the plane of section line 5—5 of FIG. 3.
Figure 6:
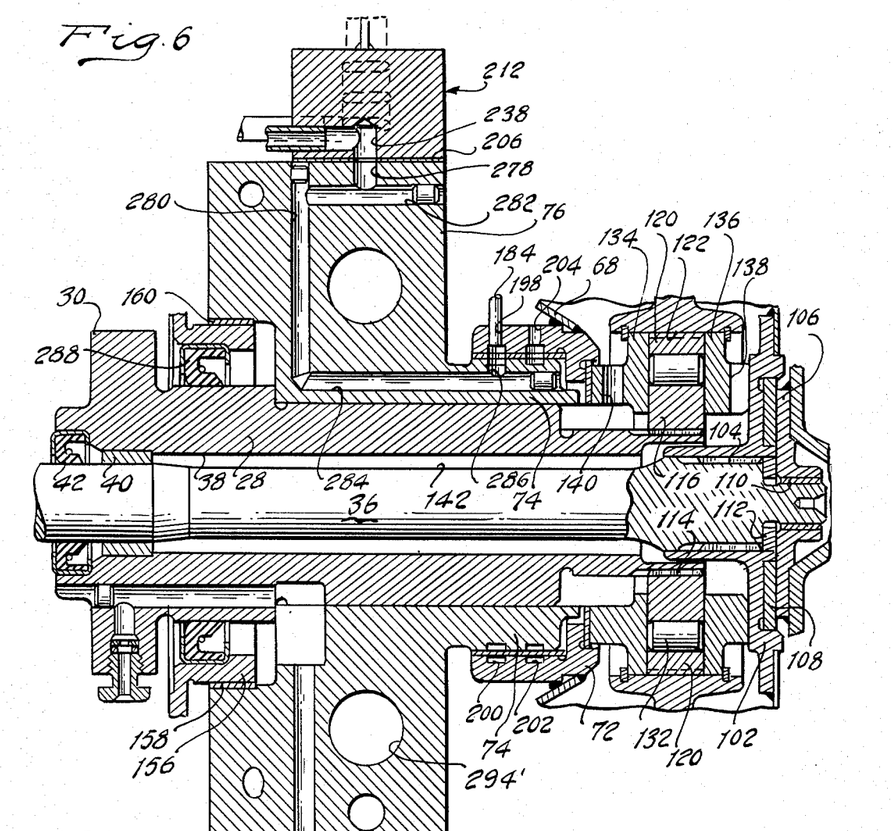
FIG. 6 is a longitudinal cross sectional view taken along the plane of section line 6—6 of FIG. 3.

Referring first to FIGS. 1, 5 and 6, numeral 20 refers to a transmission housing in the form of a drum. The housing includes an end wall 22 having a central opening 24 at its hub. Adapter 26 is received within the opening 24 and is welded in place as indicated. A stationary sleeve shaft 28 is bolted to the adapter 26, a suitable flange 30 being provided for this purpose.

A shoulder 32 formed on a radial outward portion of wall 22 may be bolted to a radial outward part of a transmission housing 34 which encloses a gear system, not shown.

A turbine driven shaft 36 extends through a central opening 38 in the sleeve shaft 28 and is journalled by a suitable bushing 40. Fluid seals are provided, as shown at 42 and 44, to isolate the fluid in the housing 20 from the fluid in the housing 34.

The other end of drum 20 has secured thereto a wall 46 having a peripheral margin that is bolted to a flange 48 formed on the end of drum 20. The wall 46 is recessed, as shown at 48, to accommodate the impeller shell assembly for the torque converter unit subsequently to be described.

Wall 46 is formed with a central opening 50 through which a crankshaft 52 for an internal combustion engine extends. The end of crankshaft 52 is bolted to the hub of a drive plate 54. The outer periphery of drive plate 54 is secured to the impeller by means of adapters 56 which are secured to the outer surface of impeller shell part 58. The radially inward portion of shell part 58 is formed with a hub 60 that is piloted within a pilot opening formed in the crankshaft 10. The outer periphery of shell part 58 is formed with a flange 62, which is bolted to a radially extending wall section 64 for a fluid reservoir. Wall 64 is formed with a large diameter opening through which is received the periphery 66 of a second shell part 68. An O-ring or other suitable sealing member is situated between the flange 62 and the wall section 64 shown at 70.

Figures 2, 11:
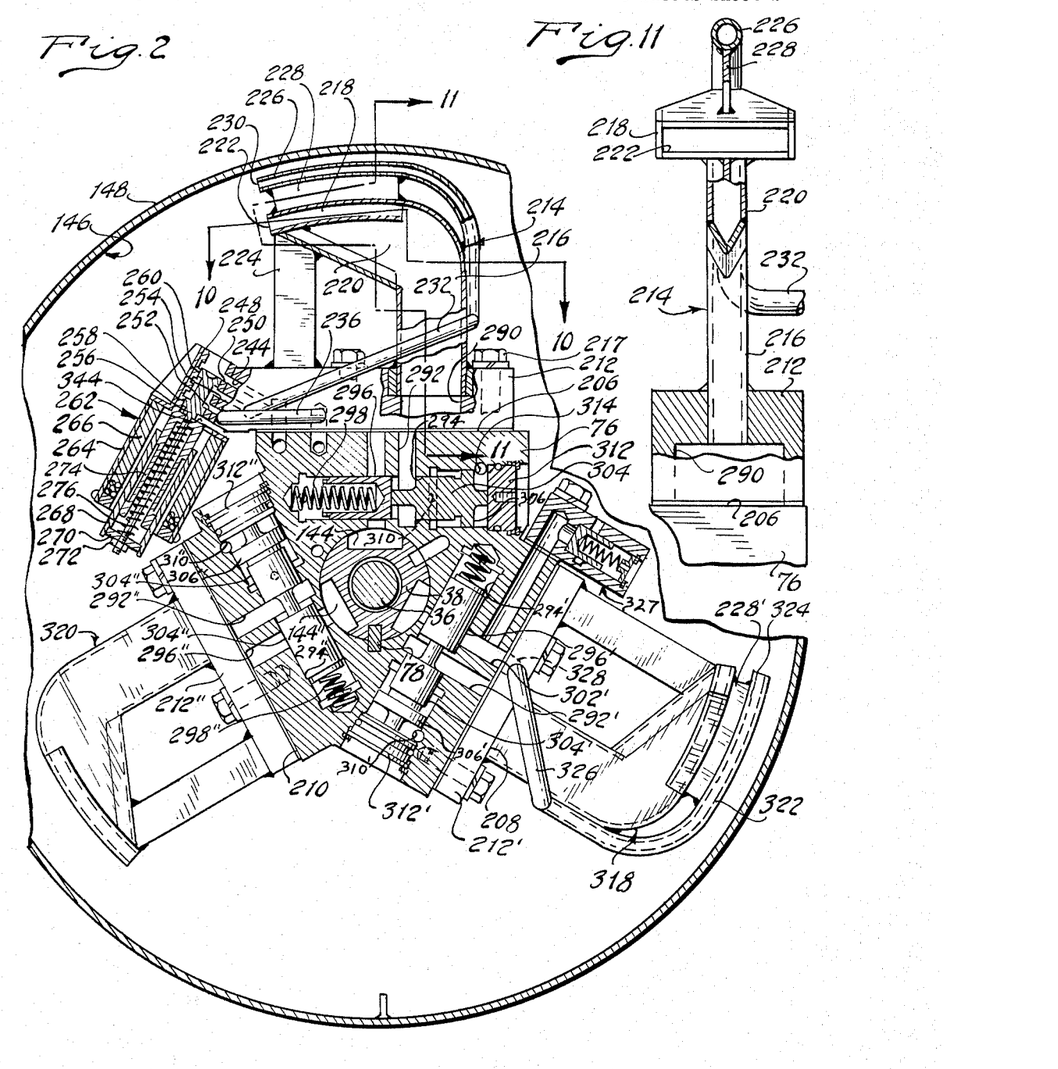
FIG. 2 shows a transverse cross sectional view taken along the plane of section line 2—2 of FIG. 1.
FIG. 11 is an end view of the scoop assembly as viewed from the plane of section line 11—11 of FIG. 2.

The shell part 68 is semi-toroidal in form and is secured to a hub 72. This hub is supported in turn by an extension 74 for a valve body 76. This valve body is supported by the sleeve shaft 28. It may be keyed to the sleeve shaft 28 by means of a key and slot connection, as shown in FIG. 2 at 78.

Secured to the inner margin of shell part 68 is a partial outer impeller blade shroud 80 located at the outward extremity of the impeller assembly. A companion partial impeller blade shroud 82 is formed at a radial inward region of the shell part 68. An inner impeller blade shroud 84 cooperates with the shrouds 80 and 82 and with the inner surface of the shell part 68 to define a radial outflow passage. Situated in this passage is a series of impeller blades 86.

A turbine 88 is located within the cavity defined by the shell part 68 and 58. It includes an outer turbine shroud 90, an inner turbine shroud 92 and turbine blades 94 situated between the shrouds and cooperating therewith to define bladed radial inflow passages that are situated in toroidal fluid flow relationship with the bladed impeller passages. Both the shrouds 84 and 92 are formed with slots that receive tabs 96 and 98 formed on the blades 86 and 94, respectively. When the tabs are inserted through their respective slots, they are bent over thereby forming a composite bladed assembly. In a similar fashion, outer shroud 90 for the turbine 88 is slotted to receive blade retaining tabs 100 located on the outer margins of the blades 94. These tabs are bent tangentially after being received through cooperating slots thereby holding the blades fast with respect to the shroud 90.

The inner region of the shroud 90 is secured to a turbine hub 102 which is internally splined to an externally splined end of the turbine driven shaft 36, as shown at 104. A thrust member 106 is situated between the hub of shell part 58 and the hub 102. Thrust forces are transferred from one to the other through a thrust washer 108. The end of turbine driven shaft 36 can be journalled within an opening formed in thrust member 106, a suitable bushing 110 being provided for this purpose. Transfer of thrust forces between shaft 36 and thrust member 106 can take place by reason of a thrust washer 112 located between them.

The right hand end of sleeve shaft 28 is splined as shown at 114 to the internally splined inner race 116 for an overrunning brake assembly 118. This assembly includes an outer race 120 which is received within an opening 122 formed in a bladed stator assembly 124. This assembly 124 includes a first shroud 126, a second shroud 128 and flow directing blades 130 situated between the shrouds. Race 120 can be keyed or otherwise secured within the opening 122.

A series of rollers 132 is located between the races 116 and 120. Race 120 can be cammed to proivde cam surfaces against which the rollers 132 are adapted to act to inhibit rotation of the stator assembly 124 in a direction opposite to the direction of rotation of the impeller, although it accommodates free-wheeling motion in the opposite direction. The portions of the race intermediate the individual rollers 132 are piloted on the outer cylindrical surface of the race 116, thereby providing a bearing support for the stator assembly.

A spacer member 134 is located between the overrunning brake assembly 118 and the impeller hub 72. A similar spacer 136 is located between brake assembly 118 and the turbine hub 102. The spacer member 136 is formed with radial passages 138 and corresponding radial passages 140 are formed in spacer member 134. Passages 138 provide fluid communication between the interior of the torus circuit of the torque converter unit and an annular passage 142 defined by the concentric stator sleeve shaft 28 and turbine shaft 36.

Stator shaft 28 is formed with an axially directed groove 144 which forms an axial flow passage that is in fluid communication with the interior of the torus circuit of the torque converter through the passages 140.

A reservoir is identified generally by reference character 146. It includes a drum shaped housing portion 148 having a flange 150 which is bolted to the outer periphery of the wall section 64. A suitable seal in the form of an O-ring 152 can be situated between the flange 150 and the wall section 64. The other end of drum portion 148 is closed by a closure wall 154. The inner region of the wall 154 is formed with an annular flange 158 that is adapted to journal a valve body 76. This valve body is formed with a shoulder 158 which is journalled on support 156 by means of a suitable bushing 160. If desired, a window 162 can be formed in the wall 154 and it may be covered by suitable closure plate 164.

An engine starter ring gear 166 is carried by and secured to wall 154 as indicated. It may mesh with an engine starter motor pinion in the usual fashion to faciliate cranking of the engine.

Passage 142 formed by the concentric shafts 28 and 36 is in fluid communication with the interior of the reservoir 146 through radial passages 168.

Figure 7:
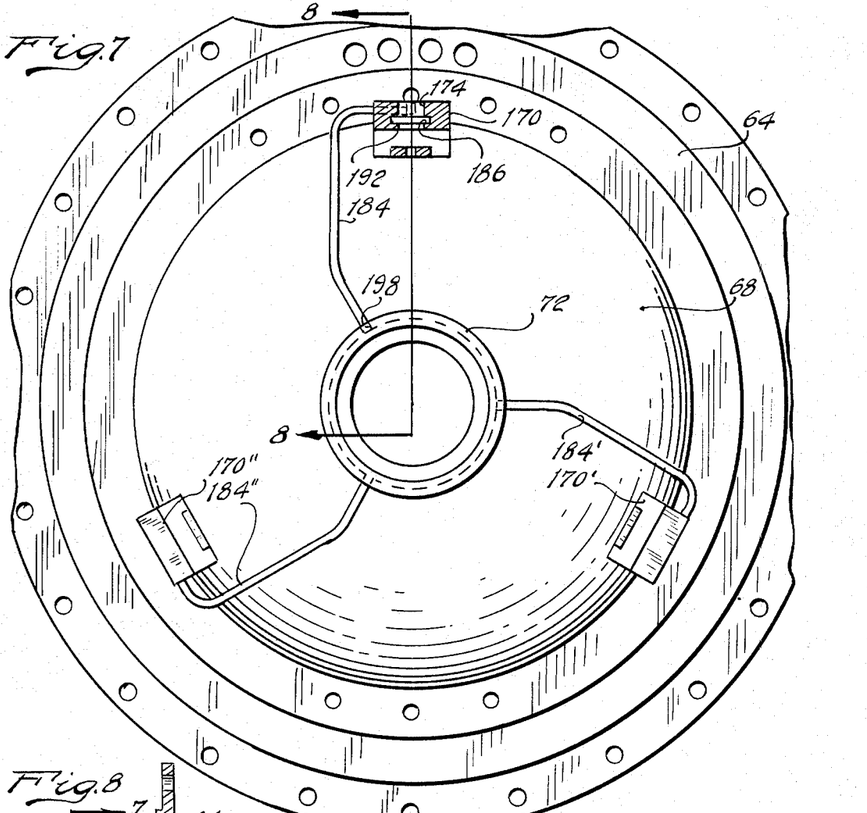
FIG. 7 is a transverse cross sectional view taken along the plane of section line 7—7 of FIG. 1.

As best seen in FIG. 7, three identical dump valve bodies 170, 170′ and 170″ are secured to the outer peripheral portion of shell part 68. If desired, each body—the body 170, for example—can be formed with an extension 172, as seen in FIG. 1, which may be welded or otherwise secured to the wall section 64 for added support. Body 170 is formed with a radial bore 174 within which is received a valve spool 176. The radial outward end of valve body 170 has secured thereto a cover plate 178, suitable bolts 180 being provided for this purpose. Plate 178 is formed with a cross-over passage 182 that is in fluid communication with the outer extremity of a fluid pressure distributor tube 184.

An exhaust port 186 is formed in valve body 170. It registers with a valve land 188 formed on spool 176. When the radially outward region of bore 174 is pressurized, valve spool 176 is moved radially inwardly until a shoulder 190 formed on valve spool 176 engages a cooperating shoulder formed on the base of the body 170. Another exhaust port 192 is formed in valve body 170, although it is radially spaced from the port 186. When the valve spool 176 assumes the position shown, communication between the ports 186 and 192 is interrupted. On the other hand, when the valve spool 176 moves radially outwardly, communication is established between these ports.

Figure 8:
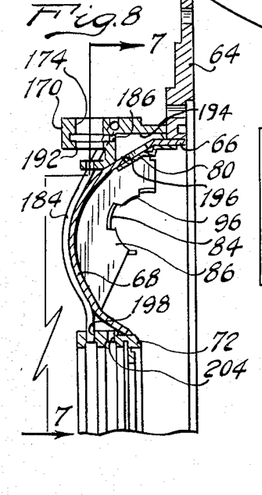
FIG. 8 is a partial longitudinal cross sectional view taken along the plane of section line 8—8 of FIG. 7.

As seen in FIGS. 8 and 1, the region 194 defined by the extension 172 of the valve body 170 and the outer periphery of the shell part 68 is in fluid communication with the interior of the torus circuit through ports 196.

Fluid pressure is distributed selectively to the outer region of the bore 174 through the tube 184. As seen in FIG. 5 and in FIG. 7, the radially inward extremity of the tube 184 is connected to a port 198 formed in the hub 72 of the impeller. This port in turn registers with an annular groove 200 formed in the extension 74 of the valve body 76 as seen in FIG. 5. A companion groove 202 formed in the extension 74 communicates with the interior of the reservoir 146 through radial passages 204. This groove 202 and passage 204 prevent pressurized fluid in the interior of the torus circuit of the torque converter from bleeding across the bearing surfaces of the hub 72 and the extension 74 into the tube 184. The passages 204 thus avoid a leakage condition that might tend to upset the calibration of the valve spool 176.

As best seen in FIG. 2, the valve body 76 is formed with three flat areas 206, 208 and 210 which are equally spaced about the axis of the torque converter at 120° intervals. Secured to area 206 is the base 212 of a first scoop assembly 214, suitable clamping bolts 217 being provided for this purpose. This scoop assembly is illustrated in detail in FIGS. 9, 10 and 11 as well as in FIG. 2.

Scoop assembly 214 includes a radially extending hollow portion 216 which may be rectangular in cross section. The radially outward extremity of the portion 216 defines a rectangular inlet 218 having an axial width that is substantially greater than the corresponding width of the portion 216, as indicated best in FIGS. 9 and 10. The inlet portion 218 becomes progressively narrower as it approaches the portion 216.

Figure 9:
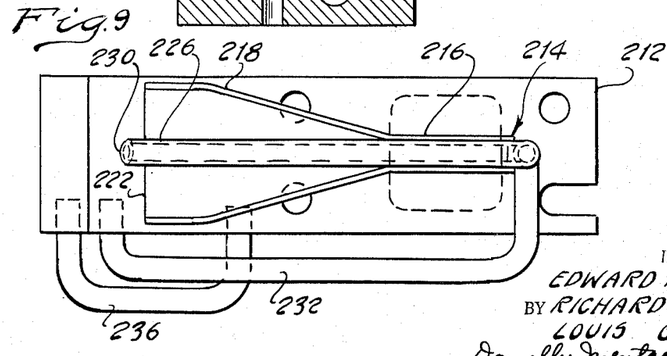
FIG. 9 is a plan view of one of the scoop assemblies of FIG. 2.
Figure 10:
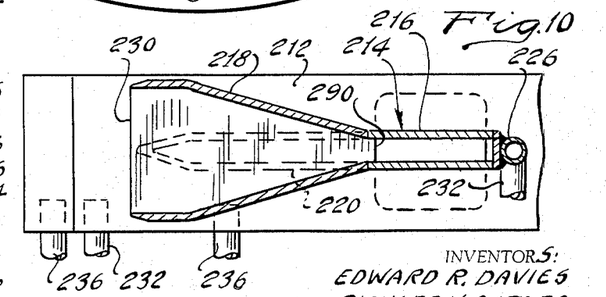
FIG. 10 is a cross sectional view of a scoop assembly taken along the plane of section 10—10 of FIG. 2.

The radially outward part 220 of the portion 216 is flanged in a diverging fashion to establish a continuous fluid flow passage from the radially inward region of the portion 216 to the intake edge 222 of the inlet portion 218. A supporting rib 224 is situated between the base 212 and the radially outward intake portion 218.

Figure 3:
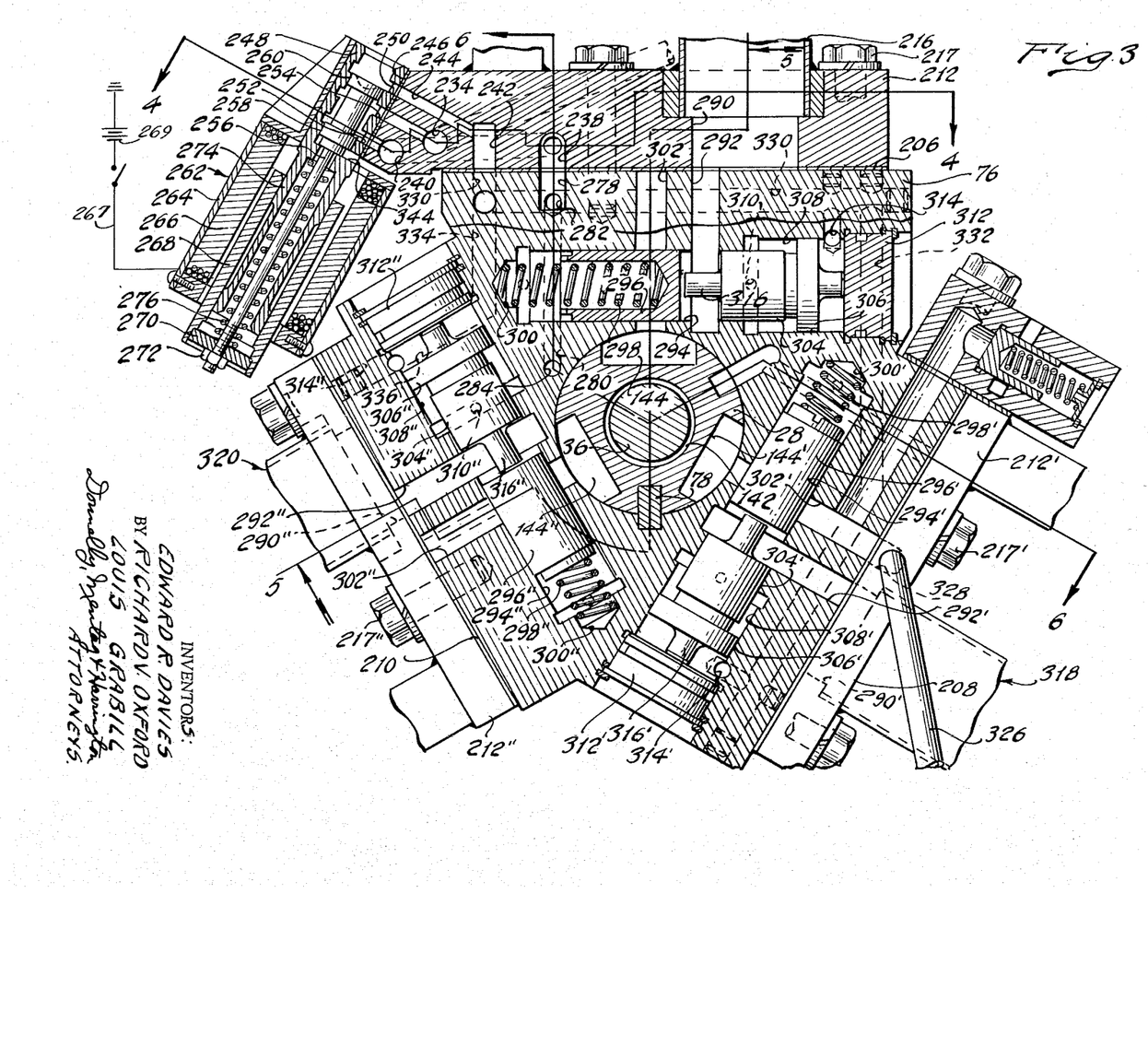
FIG. 3 is a cross sectional view taken along the plane of section line 3—3 of FIG. 4. It shows in enlarged form portions of the structure shown in FIG. 2.
Figure 4:
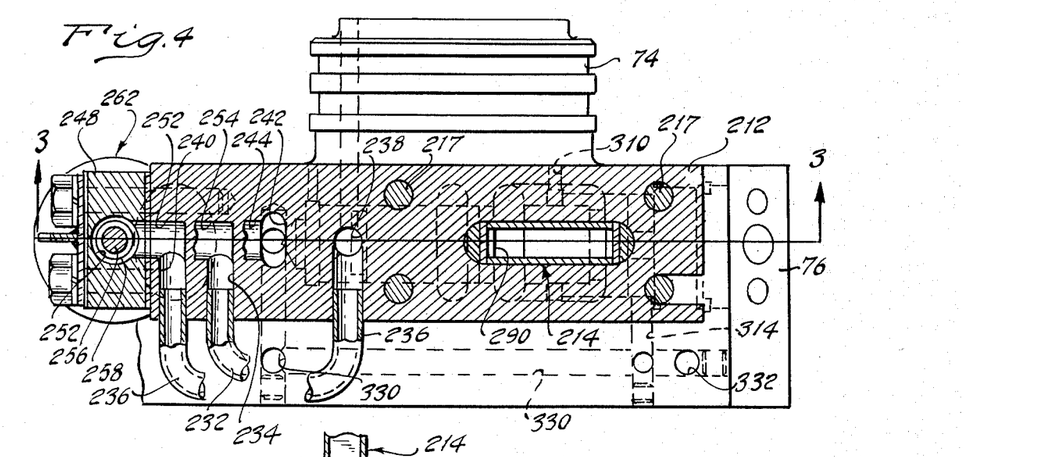
FIG. 4 is a transverse cross sectional view taken along the plane of section line 4—4 of FIG. 3.

A pressure signal pick-up tube 226 is secured to the outer margin of the intake portion 218 by means of a radial web 228. The tube is formed with an open end 230 and extends radially inwardly to a cross-over portion 232. This portion 232 communicates with a port 234 formed in the side of base 212, as best seen in FIGS. 3 and 4.

Secured also to the base 212 is another cross-over tube 236 which establishes communication between a port 238 and a port 240, both of which are formed in the base 212.

Another port 242 formed in the base 212 communicates with internal passage 244 which extends to and communicates with a valve bore 246 within which is received a valve sleeve 248. The sleeve is formed with an exhaust port 250 and two signal pressure ports 252 and 254. Port 240 communicates with port 252 through an internal munication between ports 254 and 234.

A valve spool 256 slidably disposed within the sleeve 248 is formed with two circular valve lands 258 and 260. These lands register with the ports 250, 254 and 252 as the spool 256 is shifted axially within the sleeve 248.

A solenoid actuator for the valve spool 256 is indicated generally by reference character 262. It includes a shell 264 and solenoid windings 266. The core of the solenoid is in the form of projections or fingers 268 which are tied together by cross member 270. The end of valve spool 256 is secured by means of a threaded connection 272 to the cross piece 270. The fingers 268 are piloted on an extension 274 carried by the sleeve 248.

The solenoid windings 266 can be connected through a suitable switching circuit 267 to a 6-volt battery 269 or a 12-volt battery or some other suitable voltage source. When the solenoid is energized, the spool 256 is shifted in an upward direction as viewed in FIG. 2. When the solenoid is deenergized the spool is returned to the position shown in FIG. 2 by means of a return spring 276 that surrounds the extension of the spool 256. The circuit 267 for the windings 266 can be opened and closed by the vehicle operator to position appropriately the spool 256.

As best seen in FIG. 6, port 238 communicates with a radial passage 278 formed in the body 76. This passage in turn communicates with a radially extending passage 280 through a cross-over passage 282. Passage 280 in turn communicates with an axially extending passage 284 formed in the extension 74 of the valve body 76. This passage 284 in turn is in fluid communication with tube 184 through a radial port 286.

A fluid seal 288, as shown in FIGS. 1 and 6, is situated between the support 156 and the sleeve shaft 28 to isolate the interior of the reservoir 146 from the interior of the housing shown in part at 20.

The radially inward end of the scoop portion 216, as seen in FIG. 2, communicates with an internal passage 290 formed in the support 212. A milled passage 292 is formed in the valve body 76 to establish communication between passage 290 and a valve bore 294. Slidably situated within the valve bore 294 is a cylindrical valve spool 296 which is spring biased in a right hand direction, as viewed in FIG. 2, by means of a valve spring 298 situated between the end of the bore 294 and the spool 296. When the spool 296 is positioned as shown, communication between passage 292 and the second milled passage 302 is interrupted. This passage 302 in turn is in fluid communication with the axial flow passage 144 shown in FIGS. 1, 2 and 3.

Slidably situated also in bore 294 is a second valve spool having differential valve lands 304 and 306. Land 306 is received within a large diameter portion 308 of the bore 294. The cavity defined by the differential diameter lands 304 and 306 and by the cooperating large diameter bore portion 308 is exhausted through an appropriate exhaust port 310 to prevent a fluid lock.

The right hand side of the valve bore is closed by a closure plug 312. The cavity located between the right hand side of the land 306 and the plug 312 communicates with a pressure passage 314 formed in the body 76.

The valve spool of which lands 304 and 306 form a part includes an extension 316 that is adapted to engage the spool 296.

Similar scoop assemblies are shown at FIG. 2 at 318 and 320. These are secured respectively to surfaces 208 and 210 of the valve body 76. The construction of the scoop assemblies 318 and 320 is substantially identical to the construction of the scoop assembly 214, and they need not be described in particular for this reason. The elements of the assembly 318 and counterpart elements in the assembly 214 have been designated by similar reference characters, although prime notations have been added. In a similar fashion, the counterpart elements of the assembly 320 have been indicated by similar reference characters, although double-prime notations have been added. The functions of the elements having similar reference characters are the same.

The scoop assembly 218 includes a cooling oil pick-up tube 322 that is mounted in a fashion similar to the mounting means for tube 226. Tube 322 is formed with an open end 324. It extends radially inwardly to a cross-over tube 326 which communicates with a port 328 formed in support 212'. This port 328 communicates continuously with passage 302'. Passage 302' communicates in turn with the interior of the torus circuit through a flow path defined in part by axial flow passage 144', which corresponds to passage 144. A pressure relief valve 327, which is in fluid communication with passage 302, limits the maximum cooling oil pressure made available to the converter.

In FIG. 3 it is seen that port 242, when spool 258 is shifted upwardly, is in continuous communication with passage 314 through an internal cross-over passage 330. It is apparent, therefore, that the pressure that is developed in tube 226 is distributed through cross-over portion 232 and through port 254 in the valve sleeve 248, through port 250 in sleeve 248, through passage 244, through passage 330 and through port 314 to the right hand side of the valve land 306. This same pressure is distributed also through another internal passage 332, shown in FIG. 3, to valve port 314' which corresponds to port 314. This tends to pressurize the cavity between valve land 306' and closure plug 312'.

Passage 330 communicates also with port 314" through internal passages 334 and 336, thereby tending to pressurize the cavity between closure plug 312" and the valve land 306".

If we now assume that the valve spool 256 is positioned as shown in FIG. 2, the pressure in tube 226 is distributed from port 234 and through ports 252 and 254 in the solenoid valve assembly to cross-over passage 236. From there it is distributed to passage 278 formed in valve body 76. It then is made available to the dump valve elements to cause them to assume an exhaust passage closing position.

To condition the mechanism for operation, the reservoir is filled to a predetermined level. As the engine begins to operate, the reservoir 146 rotates with the impeller assembly and in this way a cylindrical body of fluid is created by reason of the centrifugal force acting upon it. To facilitate circulation of the fluid and to maintain the angular velocity of the fluid at a value that is substantially the same as the angular velocity of the reservoir, baffles 340 are provided as indicated in FIG. 1 on the interior of the drum 148.

If it is assumed that the reservoir turns with the engine in a clockwise direction as viewed in FIG. 2, a velocity pressure due to the rotating fluid will be developed at the inlet edges 230, 230' and 230" for the scoop assemblies. The fluid then will be forced radially inwardly under the influence of centrifugal pressure and velocity pressure thereby pressurizing passages 292, 292' and 292". This will shift valve spools 296, 296' and 296" thereby establishing communication between passage 292 and passage 302, between passage 292' and passage 302' and between passage 292" and passage 302". Fluid then will pass axially through the axial flow passages 144, 144' and 144" into the interior of the torus circuit of the torque converter. The air that is displaced from the inner torus region of the torque converter passes through passages 138 in the spacer 136 and through the annular passage 142 defined by the shafts 36 and 28, and finally through radial passages 168 to the fluid reservoir 146. To assist in the evacuation of air, a series of short tubes 342 can be provided as shown in FIG. 1 in the impeller assembly. They extend axially from the eye or inner torus region of the torque converter and through the bladed passages of the impeller to the interior of the reservoir 146. The converter then will fill immediately upon starting the vehicle engine. At the same time, pressure is developed at the inlet 230 for the tube 226. This pressure is distributed then through the solenoid valve assembly to the cross-over passage 236 and from there it is distributed to the radial outward region of the dump valve bore 174 through passages 284 and 286, and also through tube 184. This closes the exhaust port 186 thereby preventing discharge of fluid through the dump valve assembly.

If the operator desires to disconnect the engine from the power input gear element of the gear system, which may be drivably connected to shaft 36, he simply closes the electrical circuit for the solenoid windings 266. This causes valve spool 256 to shift in an upward direction as viewed in FIG. 3, thereby exhausting port 240 through exhaust port 344 in the valve sleeve 248 shown in FIG. 2. As soon as this occurs, the pressure at the radially outward region of the dump valve bore 174 is exhausted, thereby allowing the valve spool 176 to shift radially outwardly under the influence of centrifugal force to open exhaust port 186. This permits the fluid within the torus circuit of the torque converter to dump immediately into the reservoir. In one embodiment of our invention, the dumping time is less than a half second.

When the converter is in operation and is filled, the level of the fluid in the reservoir decreases to a point where the radial dimension of the rotating body of fluid is insufficient to cover the opening 222 for scoop assembly 214 and the corresponding openings for the other scoop assemblies 318 and 320. The filling time necessary to restore fifty percent of the total torque capacity may be about three-fourths of a second, and the time necessary to restore full capacity may be about one second. The volume of fluid that remains in the reservoir after the converter is filled, however, is sufficient to maintain the inlet 230 for the tube 226 and the inlet 324 for the tube 322 within the rotating body of fluid. Thus a pressure signal is maintained at all times in the tube 226. In a similar fashion, a continuous circulating oil pressure is maintained in the tube 322.

When the converter is filled and the scoops are starved of fluid by reason of the reduction in volume of fluid in the reservoir, the valve spools 296 and 296' and 296" will shift under influence of their respective springs thereby blocking again communication between passages 302 and 292, and between the corresponding passages of the other two valve assemblies in the valve body 76. This prevents back-flow of fluid from the converter into the reservoir.

When the operator desires to interrupt the torque delivery path through the driveline, he simply energizes the solenoid valve assembly, as explained previously. This causes the pressure signal in tube 226 to be distributed to ports 314, 314' and 314" instead of to the radially outward region of the dump valve assemblies. This then causes valve land 304 to shift in a left hand direction, thereby blocking passage 292. In a similar fashion, the valve lands 304' and 304" block passages 292' and 292" respectively. This allows fluid to return to the reservoir through the dump valve assemblies without having it return again through the scoop assemblies. This condition is maintained until the operator chooses to de-energize the solenoid valve assembly. At that time the pressure that is developed by the scoop assemblies urges the valve lands 304, 304' and 304" to their open positions, thereby again establishing a fluid flow path for the return flow of fluid to the torus circuit. Initial movement of the valve lands 304, 304' and 304" to their open positions takes place because of the spring force of the springs 298, 298' and 298" respectively.

During the interval in which the torque delivery path is interrupted, the operator may change the speed ratio of the gear system in the usual fashion. Thus any one of several drive ranges can be selected as desired. We contemplate that a manually operated gear shift mechanism can be employed for this purpose although automatic and semi-automatic speed ratio change structures can be adapted to this environment if desired.

Having thus described a preferred embodiment of our invention, what we claim and desire to secure by United States Letters Patent is:

1. A hydrokinetic power transmission mechanism comprising: an impeller assembly and a turbine assembly situated in toroidal fluid flow relationship in a common torus circuit, a fluid reservoir connected to and rotatable with said impeller assembly, dump valve means carried by said impeller assembly at a radially outward region thereof for establishing selectively communication between said circuit and said reservoir, said dump valve means comprising an exhaust port in fluid communication with said circuit and a valve element movable radially inwardly to an exhaust port closing position and movable radially outwardly under the influence of centrifugal force to an exhaust port opening position, a scoop assembly comprising fluid conduit structure extending from a radially outward region of said reservoir to a radially inward region thereof, means for mounting said scoop assembly on a stationary portion of said mechanism, internal passage means for establishing fluid communication between the inner torus region of said circuit and the radially inward region of said reservoir flow control valve means for selectively establishing and interrupting flow through said internal passage means, a control signal passage means for distributing to said dump valve means the fluid pressure that is developed by the rotating fluid within said reservoir including a pressure passage having an intake portion submerged in said fluid with an inlet facing upstream with respect to the rotating fluid in said reservoir, and selectively operable valve means in said signal passage means for opening and closing said signal passage means to allow said dump valve means to assume an exhaust port opening position, said flow control valve means and said dump valve means being in fluid communication with said selectively operable valve means whereby they are adapted to be actuated in response to the same pressure signal in said signal passage means.

2. A hydrokinetic power transmission mechanism comprising: an impeller assembly and a turbine assembly situated in toroidal fluid flow relationship in a common torus circuit, a fluid reservoir connected to and rotatable with said impeller assembly, dump valve means carried by said impeller assembly at a radially outward region thereof for establishing selectively communication between said circuit and said reservoir, said dump valve means comprising an exhaust port in fluid communication with said circuit and a valve element movable radially inwardly to an exhaust port closing position and movable radially outwardly under the influence of centrifugal force to an exhaust port opening position, a scoop assembly comprising fluid conduit structure extending from a radially outward region of said reservoir to a radially inward region thereof, means for mounting said scoop assembly on a stationary portion of said mechanism, internal passage means for establishing fluid communication between the inner torus region of said circuit and the radially inward region of said reservoir flow control valve means for selectively establishing and interrupting flow through said internal passage means, a control signal passage means for distributing to said dump valve means the fluid pressure that is developed by the rotating fluid within said reservoir including a pressure passage having an intake portion submerged in said fluid with an inlet facing upstream with respect to the rotating fluid in said reservoir and selectively operable valve means in said signal passage means for opening and closing said signal passage means to allow said dump valve means to assume an exhaust port opening position, the fluid in said reservoir being in the form of an annular rotating fluid body when said impeller assembly is rotating, the inner diameter of said body increasing as said circuit is filled to a point where the intake portion of said scoop assembly is uncovered, said flow control valve means assuming a closed position when said dump valve assumes a closed position.

3. A hydrokinetic power transmission mechanism comprising: an impeller assembly and a turbine assembly situated in toroidal fluid flow relationship in a common torus circuit, a fluid reservoir connected to and rotatable with said impeller assembly, dump valve means carried by said impeller assembly at a radially outward region thereof for establishing selectively communication between said circuit and said reservoir, said dump valve means comprising an exhaust port in fluid communication with said circuit and a valve element movable radially inwardly to an exhaust port closing position and movable radially outwardly under the influence of centrifugal force to an exhaust port opening position, a scoop assembly comprising fluid conduit structure extending from a radially outward region of said reservoir to a radially inward region thereof, means for mounting said scoop assembly on a stationary portion of said mechanism, internal passage means for establishing fluid communication between the inner torus region of said circuit and the radially inward region of said reservoir, a control signal passage means for distributing to said dump valve means the fluid pressure that is developed by the rotating fluid within said reservoir including a fluid conduit with a mouth submerged in said fluid and facing upstream with respect to the rotating fluid in said reservoir, operator controlled valve means for selectively interrupting said signal passage means to allow said dump valve means to assume an exhaust port opening position, the fluid in said reservoir being in the form of an annular rotating fluid body when said impeller assembly is rotating, the inner diameter of said body increasing as said circuit is filled to a point where the intake portion of said scoop assembly is uncovered, flow control valve means situated in and partly defining said internal passage means for blocking said internal passage means when said dump valve means is in an exhausting position, said signal passage means including a branch portion extending to said flow control valve means, operator controlled valve means being adapted to distribute selectively the signal pressure developed by the rotating fluid in said reservoir to said flow control means and said dump valve means for actuating them.

4. A hydrokinetic power transmission mechanism comprising: an impeller assembly and a turbine assembly situated in toroidal fluid flow relationship in a common torus circuit, a fluid reservoir connected to and rotatable with said impeller assembly, dump valve means carried by said impeller assembly at a radially outward region thereof for establishing selectively communication between said circuit and said reservoir, said dump valve means comprising an exhaust port in fluid communication with said circuit and a valve element movable radially inwardly to an exhaust port closing position and movable radially outwardly under the influence of centrifugal force to an exhaust port opening position, a scoop assembly comprising fluid conduit structure extending from a radially outward region of said reservoir to a radially inward region thereof, means for mounting said scoop assembly on a stationary portion of said mechanism, internal passage means for establishing fluid communication between the inner torus region of said circuit and the radially inward region of said reservoir, a control signal passage means for distributing to said dump valve means the fluid pressure that is developed by the rotating fluid within said reservoir including a pressure passage having an intake portion submerged in said fluid, means for selectively interrupting said passage means to allow said dump valve means to assume an exhaust port opening position, the fluid in said reservoir being in the form of an annular rotating fluid body when said impeller assembly is rotating, the inner diameter of said body increasing as said circuit is filled to a point where the intake portion of said scoop assembly is uncovered, flow control valve means situated in and partly defining said internal passage means for blocking said passage means when said dump valve means is in an exhausting position, said signal passage means including a branch portion extending to said flow control valve means, and operator controlled valve means for distributing selectively the signal pressure developed by the rotating fluid in said reservoir to said flow control means and to said dump valve means for actuating the same, said flow control valve means being bipartite in form and including first and second shiftable valve spools, spring means for urging said valve spools in one direction, said pressure signal acting on said flow control valve means to urge said first valve spool in the opposite direction and block said internal passage means to prevent flow of fluid through said scoop assembly when said dump valve means is actuated to an open position, said second valve spool being shiftable in said one direction under the influence of said spring means to a passage structure closing position when said dump valve means assumes a closed position thereby accommodating one way flow through said scoop assembly to said torus circuit.

5. A hydrokinetic power transmission mechanism comprising: an impeller assembly and a turbine assembly situated in toroidal fluid flow relationship in a common torus circuit, a fluid reservoir connected to and rotatable with said impeller assembly, dump valve means carried by said impeller assembly at a radially outward region thereof for establishing selectively communication between said circuit and said reservoir, said dump valve means comprising an exhaust port in fluid communication with said circuit and a valve element movable radially inwardly to an exhaust port closing position and movable radially outwardly under the influence of centrifugal force to an exhaust port opening position, a scoop assembly comprising fluid conduit structure extending from a radially outward region of said reservoir to a radially inward region thereof, means for mounting said scoop assembly on a stationary portion of said mechanism, internal passage means for establishing fluid communication between the inner torus region of said circuit and the radially inward region of said reservoir, a control signal passage means for distributing to said dump valve means the fluid pressure that is developed by the rotating fluid within said reservoir including a pressure passage having an intake portion submerged in said fluid, means for selectively interrupting said passage means to allow said dump valve means to assume an exhaust port opening position, the fluid in said reservoir being in the form of an annular rotating fluid body when said impeller assembly is rotating, the inner diameter of said body increasing as said circuit is filled to a point where the intake portion of said scoop assembly is uncovered, flow control valve means situated in and partly defining said internal passage means for blocking said passage means when said dump valve means is in an exhausting position, said signal passage means including a branch portion extending to said flow control valve means, operator controlled valve means for distributing selectively the signal pressure developed by the rotating fluid in said reservoir to said flow control means and to said dump valve means for actuating the same, said flow control valve means being bipartite in form and including first and second shiftable valve spools, spring means for urging said valve spools in one direction, said pressure signal acting on said flow control valve means to urge said first valve spool in the opposite direction and block said internal passage means to prevent flow of fluid through said scoop assembly when said dump valve means is actuated to an open position, said second valve spool being shiftable in said one direction under the influence of said spring means to a passage structure closing position when said dump valve means assumes a closed position thereby accommodating one way flow through said scoop assembly to said torus circuit, said operator controlled valve means comprising a solenoid operator and a shiftable valve spool, the latter being adapted to direct said signal pressure selectively to said dump valve means and to said flow valve means as it assumes each of two operating positions, a solenoid for shifting said valve spool from one position to another and a switching circuit means for selectively energizing said solenoid.

6. A hydrokinetic power transmission mechanism comprising: a bladed impeller assembly and a bladed turbine assembly situated in a toroidal fluid flow circuit, a rotary reservoir connected to and rotatable with said impeller assembly, valve means including a shiftable valve element located at a radially outward region of said impeller assembly for exhausting fluid from said circuit into said reservoir when it assumes one position and interrupting the exhaust flow path when it assumes another position, means for transferring fluid from said reservoir to said circuit including flow passage structure communicating with a radially inward region of said circuit, another portion of the radially inward region of said circuit being in fluid communication with said reservoir to accommodate the flow of air displaced from said circuit as said circuit is filled, an auxiliary air exhaust passage means comprising passage structure extending from the interior of said reservoir to the interior region of said circuit intermediate said impeller and turbine assemblies, said fluid transferring means comprising a scoop assembly having an intake portion located at a radially outward region of said reservoir and secured in a fixed fashion to a stationary portion of said mechanism, said scoop assembly defining a radial inflow passage, passage structure interconnecting a radially inward region of said scoop assembly with a radially inward region of said circuit, flow valve means disposed in an partly defining said passage structure for interrupting the fluid flow path between said scoop assembly and the inner torus region of said circuit when said dump valve means assumes an exhausting position, a pressure signal scoop having an intake portion at a radially outward extremity of said reservoir, a valve control signal passage means interconnecting said signal scoop with said flow valve means and said shiftable valve element whereby the latter is actuated to an exhaust flow path establishing position as said flow valve means assumes a fluid flow interrupting position.

References Cited by the Examiner

UNITED STATES PATENTS

| 2,062,281 | 12/1936 | Alison | 60—54 |
| 2,187,667 | 1/1940 | Sinclair et al. | 60—54 |
| 2,423,812 | 7/1947 | Karl et al. | 60—54 |
| 2,638,746 | 5/1953 | Kelley | 60—54 |
| 2,898,738 | 8/1959 | Sand et al. | 60—54 |

JULIUS E. WEST, *Primary Examiner.*